(12) United States Patent
Ishizaki (10) Patent No.: US 7,342,623 B2
(45) Date of Patent: Mar. 11, 2008

(54) OPTICAL ELEMENT AND LIQUID CRYSTAL DISPLAY DEVICE USING THE SAME

(75) Inventor: Koji Ishizaki, Tokyo-To (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 434 days.

(21) Appl. No.: 10/678,590

(22) Filed: Oct. 3, 2003

(65) Prior Publication Data

US 2005/0062906 A1    Mar. 24, 2005

(30) Foreign Application Priority Data

Oct. 4, 2002   (JP)   ............... 2002-292443

(51) Int. Cl.
*G02F 1/1335*   (2006.01)
(52) U.S. Cl. ...................... 349/114; 349/115
(58) Field of Classification Search ........ 349/113–114, 349/117–121, 96
See application file for complete search history.

(56) References Cited

U.S. PATENT DOCUMENTS

| | | | |
|---|---|---|---|
| 5,499,126 A * | 3/1996 | Abileah et al. ............. | 349/106 |
| 5,747,121 A * | 5/1998 | Okazaki et al. ............ | 428/1.54 |
| 5,956,113 A * | 9/1999 | Crawford .................... | 349/185 |
| 5,961,198 A * | 10/1999 | Hira et al. .................. | 362/621 |
| 6,044,196 A * | 3/2000 | Winston et al. ............. | 385/146 |
| 6,295,109 B1 * | 9/2001 | Kubo et al. ................. | 349/119 |
| 6,593,984 B2 * | 7/2003 | Arakawa et al. ............ | 349/117 |
| 6,667,788 B1 * | 12/2003 | Maruyama et al. ......... | 349/115 |
| 6,825,902 B2 * | 11/2004 | Kaneko ....................... | 349/114 |

* cited by examiner

*Primary Examiner*—David Nelms
*Assistant Examiner*—Phu Vu
(74) *Attorney, Agent, or Firm*—Harness, Dickey & Pierce P.L.C.

(57) ABSTRACT

There are provided a liquid crystal display device, which positively reflects, by a reflecting electrode and a light-shielding layer, light emitted from a backlight and further reflected from a light-shielding layer or a reflecting layer, and recycles the light while avoiding absorption in a linearly polarizing plate to improve the utilization efficiency of light and thus to realize a bright display screen, and an optical element for use in the liquid crystal display device. The liquid crystal display device comprises: a polarizer for converting light emitted from a back light source to linearly polarized light; a reflecting layer comprising a reflection area part for reflecting the linearly polarized light converted by the polarizer and a transmission area part for transmitting the linearly polarized light converted by the polarizer; and at least one phase difference plate which is disposed so that only the light transmitted through the transmission area part after conversion of the light source-derived light to the linearly polarized light by the polarizer is incident to the phase difference plate.

16 Claims, 9 Drawing Sheets

OPTICAL ELEMENT AND LIQUID CRYSTAL DISPLAY DEVICE USING THE SAME

BACKGROUND OF THE INVENTION

1. Field of the Invention

The present invention relates to an optical element for use in a liquid crystal display device.

2. Background Art

In recent years, reflection liquid crystal display devices requiring no backlight have begun to be used in displays for portable equipment such as mobile PCs by taking advantage of their features such as low power consumption, small thickness and lightweight.

Since, however, conventional reflection liquid crystal display devices display information by using external light, when the reflection liquid crystal display device is used in a dark environment, the display screen is also dark. In particular, in darkness, the display screen cannot be viewed at all. This renders the reflection liquid crystal display device unusable. In order to overcome the above problem, a semi-transmission liquid crystal display device equipped with a light source has been developed so that, in a dark environment, the liquid crystal display device can be utilized as a transmission liquid crystal display device.

Thus, both the conventional transmission liquid crystal display device and the semitransmission liquid crystal display device require the use of a backlight as a light source. In these conventional liquid crystal display devices, the power consumption of the backlight is large. In particular, in the case of a battery-driven type, the length of usable time is limited. Therefore, features of the display for portable equipment cannot be fully utilized.

With a view to solving the above problem, a liquid crystal display device, which effectively utilizes light from a backlight, is under development. For example, Japanese Patent Laid-Open No. 98961/2002 discloses a semitransmission liquid crystal display device with high transmittance in which a scattering polarizing plate is provided on the backside of a backlight so that light, which has been emitted from the backlight and reflected from a semitransmission reflector plate, is not absorbed in a polarizing plate.

Further, Japanese Patent Laid-Open No. 275629/2000 discloses a liquid crystal display device which has been improved in utilization efficiency of light by using a cholesteric liquid crystal and a phase difference plate, i.e., a retardation film, in a black matrix.

In the liquid crystal display device disclosed in Japanese Patent Laid-Open No. 98961/2002, however, light, which has been emitted from the light source and absorbed or reflected from a light-shielding layer and the like, is disadvantageously absorbed in a linearly polarizing plate and cannot be effectively utilized. Further, in the liquid crystal display device disclosed in Japanese Patent Laid-Open No. 275629/2000, the cholesteric liquid crystal should be stacked, and, in addition, patterning is necessary. This increases the number of production process steps, leading to an increase in cost.

Figure 18:
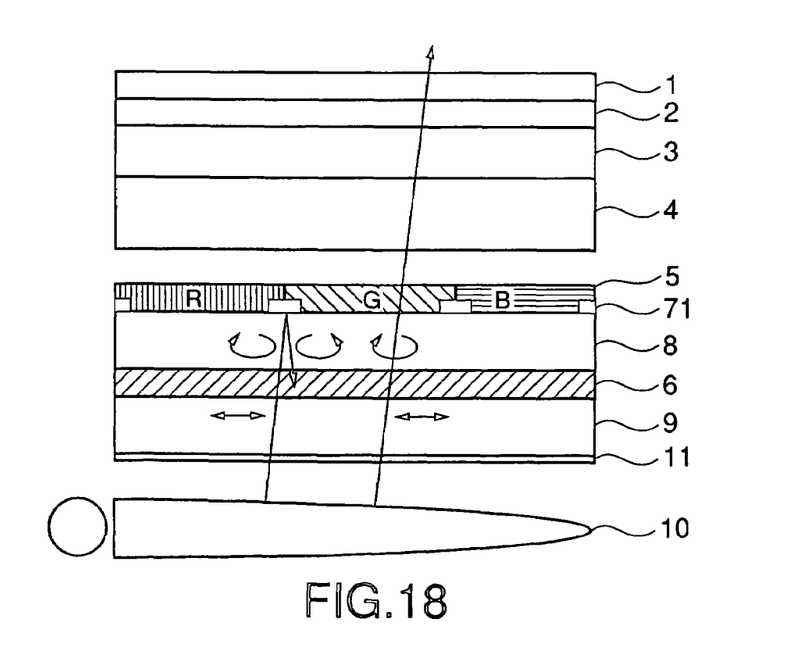
FIG. 18 is a schematic cross-sectional view of a conventional liquid crystal display device.

Specifically, in the conventional semitransmission liquid crystal display device, when a circularly polarizing plate is used as the polarizing plate on the light source side, as shown in FIG. 18, light emitted from the backlight source is passed through a linearly polarizing plate and consequently converted to linearly polarized light. The light converted to the linearly polarized light is then passed through a quarter-wave ($\frac{1}{4}\lambda$-wave) phase difference plate and consequently converted to right-handed circularly polarized light or left-handed circularly polarized light. The light converted to the circularly polarized light is incident to a liquid crystal layer or is reflected from a reflecting electrode provided in the liquid crystal layer. In this case, the direction of circular polarization of the light reflected from the reflecting electrode becomes opposite to the direction of circular polarization of the light before incidence to the reflecting electrode. Thereafter, the reflected light is again passed through the phase difference plate and consequently is converted to a linearly polarized light of which the direction is orthogonal to the transmission axis of the linearly polarizing plate. Therefore, the linearly polarized light cannot be passed through and is disadvantageously absorbed in the linearly polarizing plate. Further, in the conventional transmission liquid crystal display device, as shown in FIG. 18, a light-shielding layer composed of a black pigment or a metal such as chromium (Cr) and CrO or the like is provided between individual colors of a color filter (for example, between B (black) and R (red), between R (red) and G (green), or between G (green) and B (black). The light-shielding layer functions to prevent the contrast ratio from being lowered as a result of leakage of light from the backlight from between the individual colors and to prevent a lowering in off resistance caused by the arrival of external light at TFT. The light-shielding layer is used for preventing the transmission of light emitted from the backlight to the viewer side. Therefore, in the light-shielding layer formed of a black pigment, disadvantageously, light introduced from the backlight is substantially entirely absorbed, and, also in the light-shielding layer composed of a metal such as chromium and CrO, the reflectance is low although a certain level of the light is reflected toward the backlight side.

Thus, the conventional liquid crystal display devices involve a problem that light supplied from the backlight to the reflecting electrode or the light-shielding plate cannot be satisfactorily reused.

Further, when the cholesteric liquid crystal and the phase difference plate are used in the black matrix, the structure of the display device is complicated. This requires many process steps, leading to a problem with a high cost.

SUMMARY OF THE INVENTION

Accordingly, an object of the present invention is to provide a liquid crystal display device, which positively reflects, by a reflecting electrode and a light-shielding layer, light emitted from a backlight and further reflected from a light-shielding layer or a reflecting layer, and recycles the light while avoiding absorption in a linearly polarizing plate to improve the utilization efficiency of light and thus to realize a bright display screen, and to provide an optical element for use in the liquid crystal display device.

According to a first aspect of the present invention, there is provided an optical element for a liquid crystal display device, comprising: a polarizer for converting light emitted from a back light source to linearly polarized light; a reflecting layer comprising a reflection area part for reflecting the linearly polarized light converted by the polarizer and a transmission area part for transmitting the linearly polarized light converted by the polarizer; and at least one phase difference plate which is disposed so that only the light transmitted through the transmission area part after conversion of the light source-derived light to the linearly polarized light by the polarizer is incident to the phase difference plate.

According to a second aspect of the present invention, there is provided an optical element for a liquid crystal display device, comprising: a polarizer for converting light from a front light source to linearly polarized light; a reflection area part for reflecting the linearly polarized light converted by the polarizer; and at least one phase difference plate which is disposed so that only the light reflected from the reflection area part is incident to said phase difference plate. The term "front light source" as used herein refers to external light such as sunlight or light from a fluorescent lamp which enters from a viewer side.

The optical element having the above construction, when applied to a liquid crystal display device, can return light reflected from the reflecting layer to the light source side without transmission through the phase difference plate and can transmit only light, which has been passed without being reflected from the reflecting layer, through the phase difference plate to convert the light to a desirably polarized state, whereby the utilization efficiency of light can be enhanced.

DETAILED DESCRIPTION OF THE INVENTION

Regarding the optical element for a liquid crystal display device, the optical element according to the first aspect of the present invention will be first described in detail.

The optical element according to the present invention constitutes a part of a liquid crystal display device and is suitable for use in a transmission liquid crystal display device or a semitransmission liquid crystal display device. The optical element according to the present invention basically comprises a polarizer for converting light emitted from a rear light source (a backlight) to linearly polarized light, a reflecting layer, and a phase difference plate, i.e., a retardation plate.

The reflecting layer comprises a reflection area part and a transmission area part, and light from the backlight is separated in the reflecting layer. The phase difference plate is disposed at such a position that only light transmitted through this reflecting layer can be incident thereto. According to this arrangement of the phase difference plate, light reflected from the reflecting layer can be returned to the light source side without being passed into the phase difference plate, while only light, which has been passed without being reflected from the reflecting layer, can be transmitted through the phase difference plate to convert the light to a desirably polarized state.

The optical element according to the second aspect of the present invention basically comprises a polarizer for converting light emitted from the front light source to linearly polarized light, a reflection area part, and a phase difference plate, and is suitable for use in a semitransmission liquid crystal display device. The reflection area part can generally be provided in a liquid crystal cell. According to the above construction, in the light which has been emitted from the front light source (external light) and polarized, only the light reflected in the reflection area part within the liquid crystal cell can be converted to a predetermined polarized state by the phase difference plate. Specifically, an LC mode adopted in the reflection area part may be different from that adopted in the transmission area part. For example, in the reflection area part, a birefringence-type TN mode using circularly polarized light may be adopted while adopting optical rotation-type TN mode using linearly polarized light in the transmission area part.

The optical distance between the reflection area part and the phase difference plate may be regulated by the thickness of the phase difference plate to make the phase difference between external light reflected from the reflection area part and light from the rear light source uniform.

Preferably, at least one phase difference plate, in which, when the refractive indexes in the orthogonal axis direction within a plane of the phase difference plate are $n_x$ and $n_y$ and the refractive index of the phase difference plate in its plate thickness-wise direction is $n_z$, a relationship represented by formula $n_x \neq n_y$ is satisfied, is included in the phase difference plate. For example, a material prepared by polymerizing a nematic liquid crystal material in a liquid crystal state, or a monoaxially stretched polymeric film may be used as this phase different plate. A combination of these materials may also be used.

On the other hand, at least one phase difference plate satisfying a relationship represented by formula $n_x = n_y \neq n_z$ may be included in the phase difference plate. For example, a material prepared by polymerizing a cholesteric liquid crystal material or a discotic liquid crystal material in a liquid crystal state, or a monoaxially or biaxially stretched polymeric film may be used as this phase different plate. A combination of these materials may also be used. When a combination of these phase difference plates is used in a liquid crystal display device, phase difference plates used in various display modes, for example, phase difference plates for TN-mode liquid crystal cells (Japanese Patent Laid-Open No. 214116/1994, U.S. Pat. Nos. 5,583,679 and 5,646,703, and German Patent Laid-Open No. 3911620A1), phase difference plates for IPS-mode or FLC-mode liquid crystal cells (Japanese Patent Laid-Open No. 54982/1998), phase difference plates for OCB-mode or HAN-mode liquid crystal cells (U.S. Pat. No. 5,805,253 and WO 96/37804), phase difference plates for STN-mode liquid crystal cells (Japanese Patent Laid-Open No. 26572/1997), and phase difference plates for VA-mode liquid crystal cells (Japanese Patent No. 2866372), can be brought to an in-cell form. The in-cell form can prevent a lowering in the efficiency of recycling of light by the phase difference plate. A compensation layer in the linearly polarizing plate may be in an out-cell form.

The in-cell form refers to a structure in which a display element is disposed between two supporting substrates, for example, a structure in which, in the case of a liquid crystal display device having a structure of front polarizing plate/front glass substrate/liquid crystal/rear glass substrate/rear polarizing plate/light source/reflector plate provided in that order from the viewer side, a display element is disposed between the front glass substrate and the rear glass substrate.

On the other hand, the out-cell form refers to a structure in which a display element is disposed at a position other than a position between two transparent substrates, for example, a structure in which, in the case of a liquid crystal display device having a structure of front polarizing plate/front glass substrate/liquid crystal/rear glass substrate/rear polarizing plate/light source/reflector plate, a display element is disposed between the viewer and the front glass substrate or/and between the rear glass substrate and the reflector plate.

Next, the optical function of the optical element according to the present invention when applied to a liquid crystal display device will be described in more detail.

1. Optical Function

The optical function of the optical element according to the present invention when applied to a liquid crystal display device will be described by taking a transmission liquid crystal display device as an example.

Figure 1:
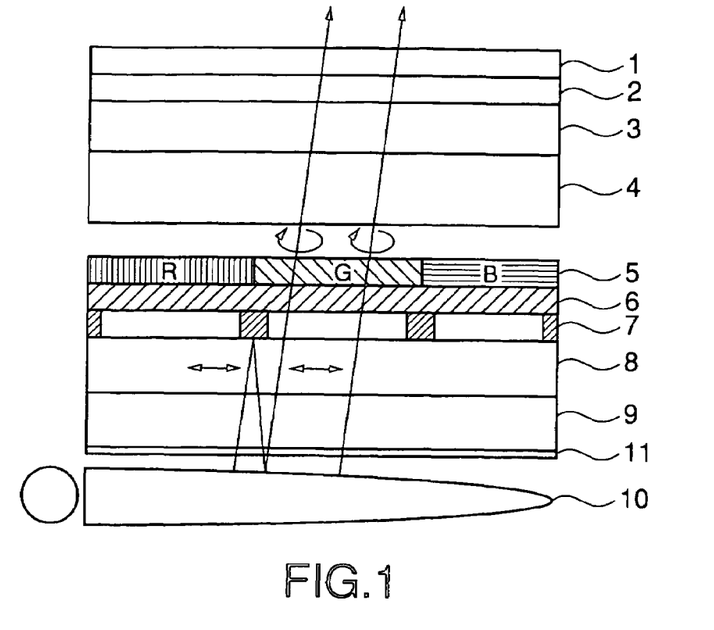
FIG. 1 is a schematic cross-sectional view showing one embodiment of a transmission liquid crystal display device using the optical element according to the present invention.

As shown in FIG. 1, a transmission liquid crystal display device comprises, provided in the following order from a viewer side, a front linearly polarizing plate 1, a front phase difference plate 2, a front glass substrate 3, a liquid crystal layer 4, a color filter layer 5, a rear phase difference plate 6, a light-shielding layer (a reflecting layer) 7, a rear glass substrate 8, a rear linearly polarizing plate 9, a backlight 10 comprising a light source, a light guide plate, a prism sheet, and a diffuser (the light guide plate, the prism sheet, and the diffuser not shown), and a reflector plate (not shown) provided on the backside of the backlight 10. If necessary, for example, a polarized light separating film 11 comprising a cholesteric liquid crystal film and a quarter-wave phase difference plate may be provided between the rear linearly polarizing plate 9 and the backlight 10. The rear glass substrate 8 may be provided between the liquid crystal layer 4 and the color filter layer 5.

Light supplied from the backlight 10 is transmitted through the rear linearly polarizing plate 9 and consequently is converted to linearly polarized light which is then incident to the rear glass substrate 8. Light passed through the rear glass substrate 8 is passed through the rear phase difference plate 6 and consequently is converted to right-handed circularly polarized light. The rear phase difference plate 6 is a phase difference plate satisfying $n_x \neq n_y$. The light converted to the circularly polarized light is passed through the color filter layer 5 and is incident to the liquid crystal layer 4. The polarization direction of the light incident to the liquid crystal layer 4 is changed by switching voltage applied to the liquid crystal layer, and this light is absorbed in the front phase difference plate 2 and the front polarizing plate 1, or otherwise is transmitted through the front phase difference plate 2 and the front polarizing plate 1 and reaches the viewer side. On the other hand, a part of the light passed through the rear glass substrate 8 is reflected from the light-shielding layer 7 provided on the backside of the color filter layer 5. The light reflected from the light-shielding layer 7 is linearly polarized light and thus is returned to the backlight 10 side, without being absorbed in the rear linearly polarizing plate 9, and recycled. Thus, when only light other than light reflected from the light-shielding layer is incident to the rear phase difference plate, the light reflected from the light-shielding layer is not absorbed in the rear linearly polarizing plate. This can enhance the utilization efficiency of light.

In a preferred embodiment of the present invention, as shown in FIG. 1, the phase difference plate is provided integrally with the color filter layer. The expression "provided integrally" refers to such a construction that the phase difference plate is provided on either the front side (viewer side) or the rear side (backlight side) of an absorption-type color filter. An intermediate layer such as a protective layer may be properly provided between the absorption-type color filter and the phase difference plate.

Further, in the present invention, preferably, a high-reflectance layer is provided on the whole area of the reflecting layer on its rear light source side. The reflecting layer constituting the substrate is preferably a light-shielding layer or/and a reflecting electrode. According to this construction, the light-shielding layer prevents the leakage of light from the backlight, and the high-reflectance layer provided on the rear light source side positively reflects light from the light source, whereby light, which has been emitted from the light source and has been absorbed in the prior art technique, can be efficiently recycled. In the case where the reflecting layer is a reflecting electrode, external light can be reflected from the reflecting electrode on its front side, and, in addition, light from the rear side (backlight side) can be efficiently reflected toward the backlight side. This can enhance the recycle efficiency of light.

Thus, the light-shielding layer 7 has a double-layer structure comprising a high-reflectance layer on its rear side and a low-reflectance layer on its front side (not shown). This construction, in which a high-reflectance layer is provided on the rear side, can enhance the reflectance of light in the reflection of light from the light-shielding layer after emission of the light from the backlight. The high-reflectance layer can be formed by vapor-depositing a metal such as aluminum, silver, or a silver alloy on the backside of a black metal which has hitherto been used as a light-shielding layer.

Further, a dielectric multilayer film may be used as the high-reflectance layer. The use of the dielectric multilayer film can enhance the reflectance of light from the backlight and consequently can improve the utilization efficiency of light. The dielectric multilayer film may be, for example, a film in which $TiO_2$ films of a high-refractive index material and $SiO_2$ films of a low-refractive index material are alternately stacked on top of each other or one another, as described in Japanese Patent Laid-Open No. 19501/2000. The laminate as the dielectric multilayer film is formed in a thickness of 50 to 350 angstroms.

Figure 2:
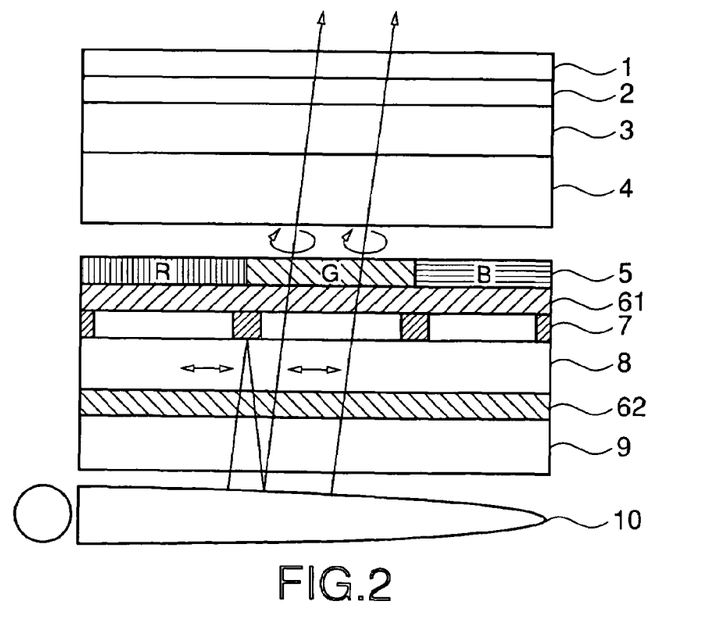
FIG. 2 is a schematic cross-sectional view showing another embodiment of a transmission liquid crystal display device using the optical element according to the present invention.
Figure 3:
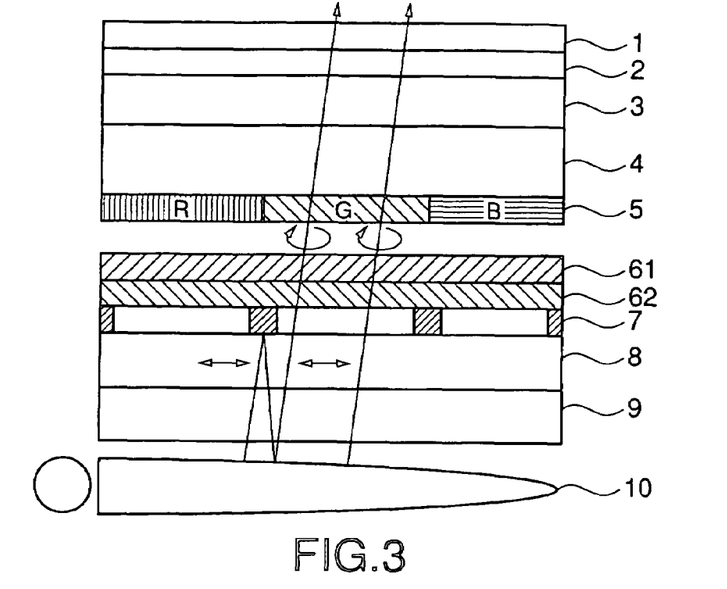
FIG. 3 is a schematic cross-sectional view showing still another embodiment of a transmission liquid crystal display device using the optical element according to the present invention.

Thus, the optical element according to the present invention is not limited so far as the construction of the optical element is such that, in the light which has been emitted from the backlight and has been converted to linearly polarized light, only light which is incident to the liquid crystal layer without being reflected is incident to the rear phase difference plate, while light reflected before the entry into the liquid crystal layer is not absorbed in the linearly polarizing plate. In addition to the above construction of the liquid crystal display device, for example, as shown in FIGS. 2 and 3, a construction may be adopted wherein a second rear phase difference plate 62, which is a half-wave fixed retarder layer, may be provided between a rear glass substrate 8 and a first rear polarizing plate 61 or between a first rear phase difference plate 61 and a color filter layer 5. A combination of the first rear phase difference plate 61 with the second rear phase difference plate 62 can provide a broadband quarter-wave phase difference plate having improved refractive index wavelength dispersion characteristics.

Here the optical function of the second rear phase difference plate (half-wave plate) will be described. In the quarter-wave phase difference plate, the slow phase axis is disposed in a direction at an angle of −45 degrees, and the quarter-wave phase difference plate has the function of permitting the entry of linearly polarized light in the vertical direction in visible light (400 nm to 700 nm) to convert the light to circularly polarized light. When the magnitude of the retardation is always a quarter wavelength of the wavelength of the incident light, this function is exhibited. In fact, in a design wavelength (550 nm), quarter-wavelength retardation is exhibited. However, in wavelengths shorter than the design wavelength, the retardation is excessive, while, in wavelengths longer than the design wavelength, the retardation is insufficient. As described above, when the first rear phase difference plate (quarter-wave phase difference plate) and the second rear phase difference plate (half-wave phase difference plate) are disposed in combination in such a manner that the stretch axis of the first rear phase difference plate makes a suitable angle with the stretch axis of the second rear phase difference plate (for example, the angle of the slow phase axis of a quarter-wave phase difference plate to the slow phase axis of a half-wave phase difference plate is 75 degrees), for light with wavelengths shorter than the reference wavelength, retardation in the half-wave phase difference plate is excessive and denies the excess of retardation in the quarter-wave phase difference plate. Similarly, for light with wavelengths longer than the reference wavelength, retardation in the half-wave phase difference plate is insufficient and thus compensates for the shortage of retardation in the quarter-wave phase difference plate. In this way, substantially fully left-handed circularly polarized light is provided over the whole wavelength region. The wavelength dispersion characteristics can be further improved by varying the angle of the stretch axis of the half-wave phase difference plate to the angle of the quarter-wave phase difference plate.

Conventional oriented film phase difference plates using resins such as polyolefin, polyvinyl alcohol, cellulose acetate, polyvinyl chloride, polymethyl methacrylate, polycarbonate, polyester, polysulfone, polystyrene, and norbornene may be used as the above phase difference plate. In the present invention, the use of a phase difference plate comprising a polymerizable liquid crystal provided on a substrate having an aligning ability is preferred. The adoption of the phase difference plate using a liquid crystal material can realize a reduction in the thickness of the phase difference plate and, in addition, can be molded integrally with a liquid crystal cell. Therefore, the production process can be simplified.

When a conventional resin film phase difference plate is used, the optical properties of the phase difference plate are deteriorated at about 120° C. For this reason, the liquid crystal layer, in which the liquid crystal cell is molded at 200° C. to 240° C., has been produced separately from the phase difference plate and the like. The use of the above polymerizable liquid crystal in the phase difference plate can improve the heat resistance of the phase difference plate, and the phase difference plate can also be molded integrally with the liquid crystal layer.

When an improvement in refractive index wavelength dispersion characteristics of the quarter-wave phase difference plate in a structure as shown in FIG. 3 is contemplated, the use of the above-described aligning film is sometimes required. In this case, the slow phase axis angle can be controlled by regulating the direction in which a substrate formed of a polyimide or the like is rubbed.

Figure 4:
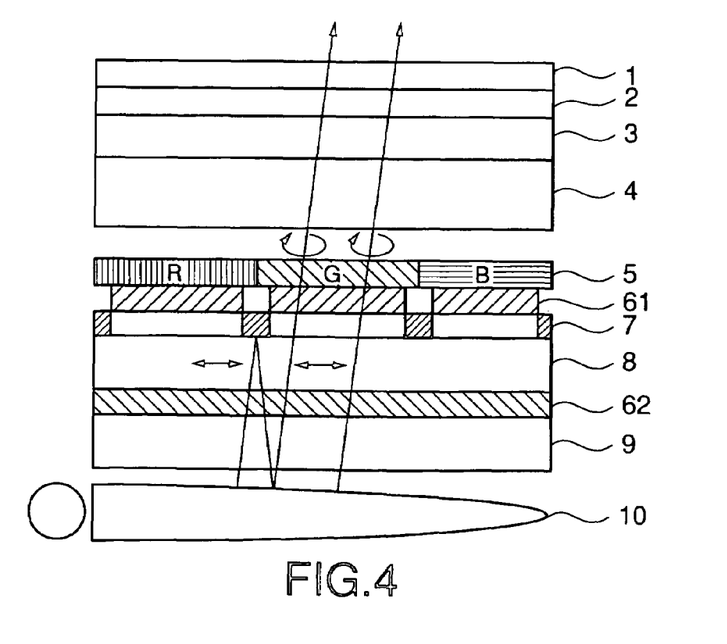
FIG. 4 is a schematic cross-sectional view showing a further embodiment of a transmission liquid crystal display device using the optical element according to the present invention.
Figure 5:
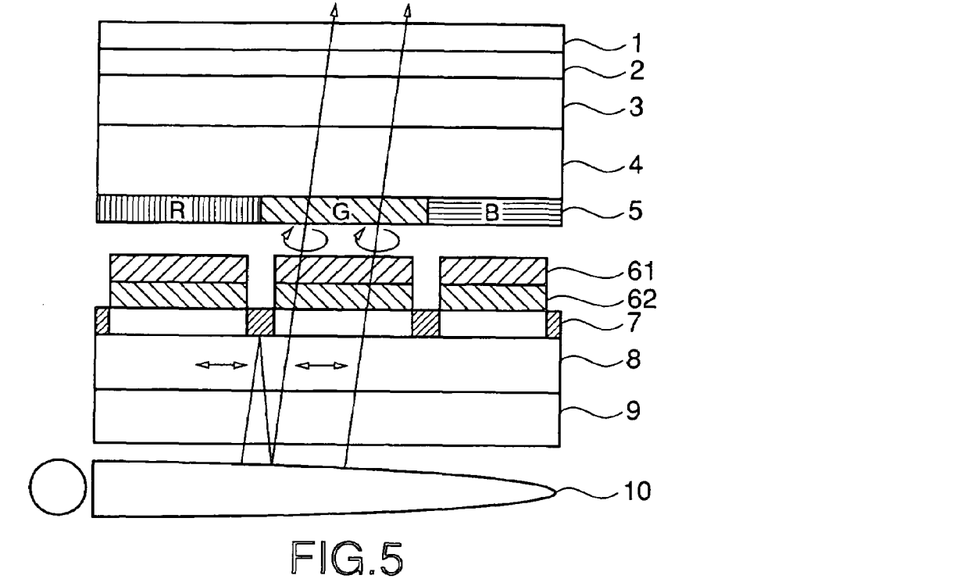
FIG. 5 is a schematic cross-sectional view showing another embodiment of a transmission liquid crystal display device using the optical element according to the present invention.

As shown in FIGS. 4 and 5, the rear phase difference plate 61 may also be patterned. Thus, a method may be adopted wherein phase difference plates corresponding respectively to RGB regions in the color filter are provided and the optical properties of the phase difference plates are regulated for each pattern.

Figure 6:
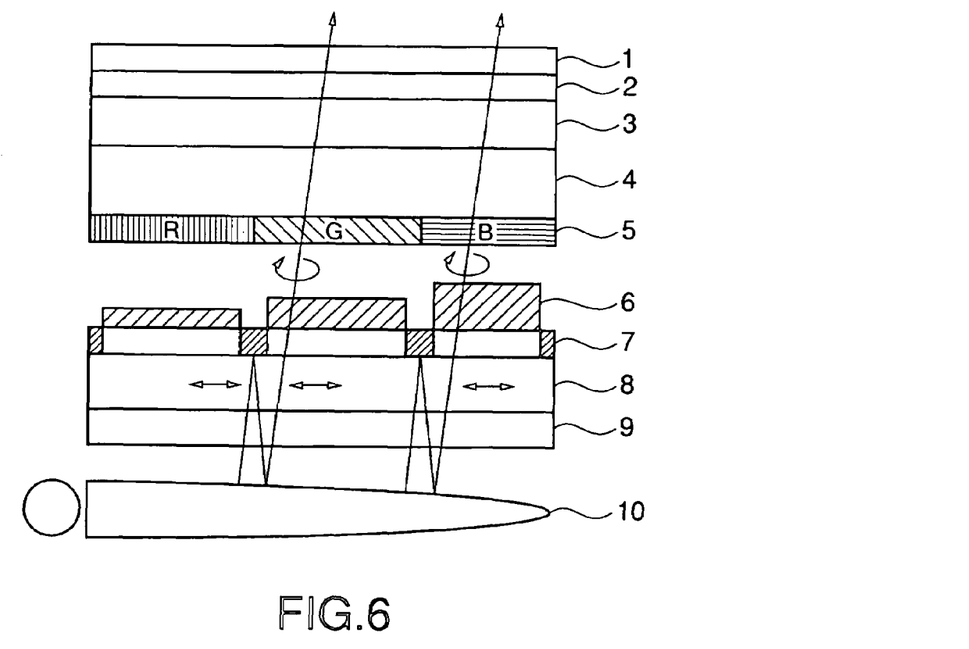
FIG. 6 is a schematic cross-sectional view showing an embodiment of a semitransmission liquid crystal display device using the optical element according to the present invention.

Further, as shown in FIG. 6, a method may be used wherein the thickness of the rear phase difference plate 6 is regulated for each wavelength region of R, G, and B. When the phase difference plates have given thickness, for example, the regulation of the thickness of the phase difference plates to the center wavelength (550 nm) results in short retardation on short wavelength side and long retardation on long wavelength side, disadvantageously leading to wavelength dispersion. As described above, actual retardation can be brought to a nearly ideal value by regulating the thickness of the phase difference plates for each color, that is, for each wavelength region, and, consequently, the wavelength dispersion can be suppressed. The wavelength dispersion can also be suppressed by regulating the thickness of the substrate provided on the backside of the phase difference plate, for example, the thickness of the color filter. Further, if necessary, regions different from each other in phase difference can be provided in one pixel.

In a reflection or semitransmission liquid crystal display device, the provision of a phase difference layer on the reflecting electrode sometimes results in lowered contrast and thus is unfavorable for display property reasons. As shown in FIG. 4, the display properties can be improved by adopting such a construction that external light reflected from the light-shielding layer 7 is not transmitted through the rear phase difference plate (quarter-wave plate) 62.

The optical function of the optical element according to the present invention when applied to a semitransmission liquid crystal display device will be described.

The application of an optical element, in which a laminate prepared by alternately stacking total-reflection metal electrode parts (reflection area parts) formed of aluminum or the like as a light-shielding layer (a reflecting electrode) and transmission electrodes (transparent area parts) is used as a reflecting layer, to a semitransmission liquid crystal display device will be described as an example. A method in which reflection and transmission are controlled according to the area ratio of the reflection area part to the transparent area part (hereinafter referred to as "area dividing method") has been applied to this reflecting layer. It is needless to say that a layer prepared by disposing a light-semitransparent metallic thin film on the whole area of a reflecting surface by vacuum deposition or the like and a layer prepared by using a cholesteric liquid crystal having a predetermined spiral pitch as a light-semitransparent thin film are also usable in the optical element according to the present invention.

Figure 7:
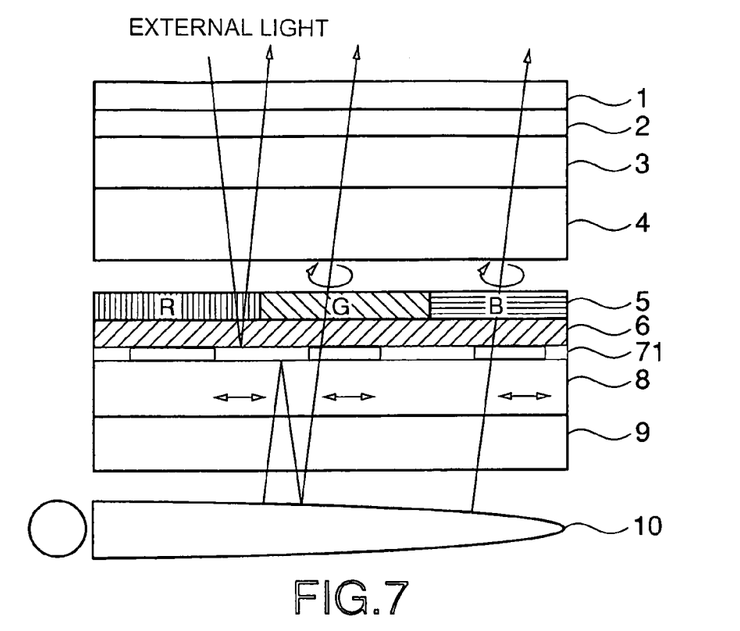
FIG. 7 is a schematic cross-sectional view showing another embodiment of a semitransmission liquid crystal display device using the optical element according to the present invention.

In the semitransmission liquid crystal display device, as shown in FIG. 7, a reflecting layer 71 is provided on the backside of a rear phase difference plate 6. This reflecting layer comprises a reflecting electrode part (a reflecting area part) and a light-transparent area part. External light (on a viewer side) is reflected from this reflecting electrode (a black part in the drawing) to the liquid crystal layer 4. As with the above transmission display device, in the semitransmission liquid crystal display device, light emitted from a backlight 10 (on a rear side) is passed through a rear polarizing plate 6 and consequently is converted to linearly polarized light. A part of the light converted to the linearly polarized light is passed through a part between adjacent reflecting electrodes (that is, the transmission area part) and is incident to a rear phase difference plate 6 and consequently is converted to right-handed circularly polarized light which is then incident to a liquid crystal layer 4. On the other hand, light, which has been emitted from the backlight 10 and incident to the backside of the reflecting electrode 71, is reflected from the reflecting electrode 71. In this case, unlike the prior art technique, this light is not absorbed in the polarizing plate and can be returned to the backlight light source side. Thus, the conversion of only light, from the rear side, which has been passed through between reflecting electrodes to circularly polarized light by the rear phase difference plate 62 can realize recycle of light reflected from the backside of the reflecting electrode 71, that is, can realize effective use of light from the backlight source.

Figure 8:
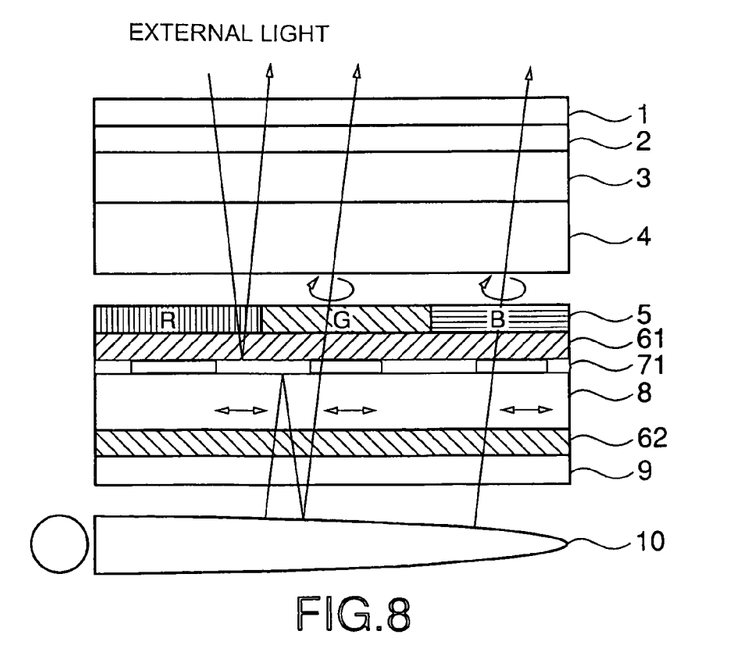
FIG. 8 is a schematic cross-sectional view showing still another embodiment of a semitransmission liquid crystal display device using the optical element according to the present invention.
Figure 9:
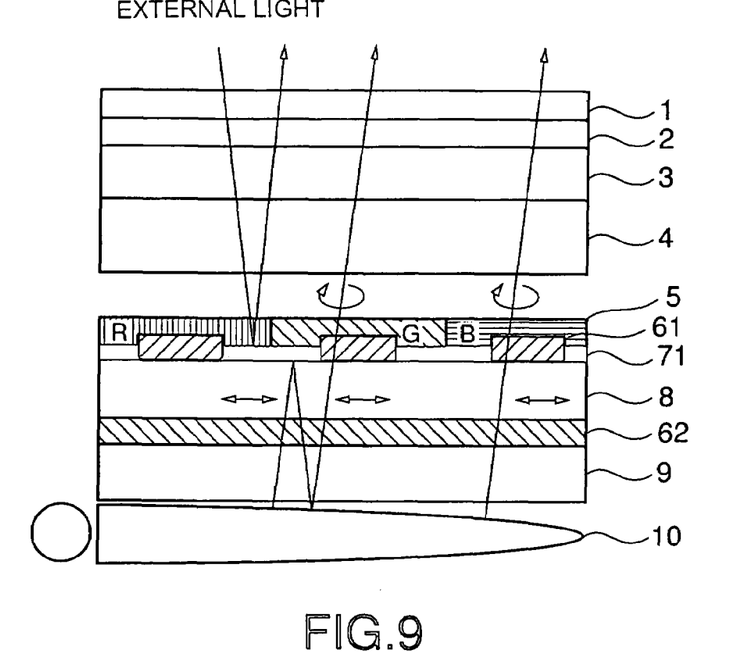
FIG. 9 is a schematic cross-sectional view showing a further embodiment of a semitransmission liquid crystal display device using the optical element according to the present invention.

Further, as with the transmission liquid crystal display device, as shown in FIGS. 8 and 9, a second rear phase difference plate 62 may be introduced, or alternatively a first rear phase difference plate 61 may be patterned.

Figure 10:
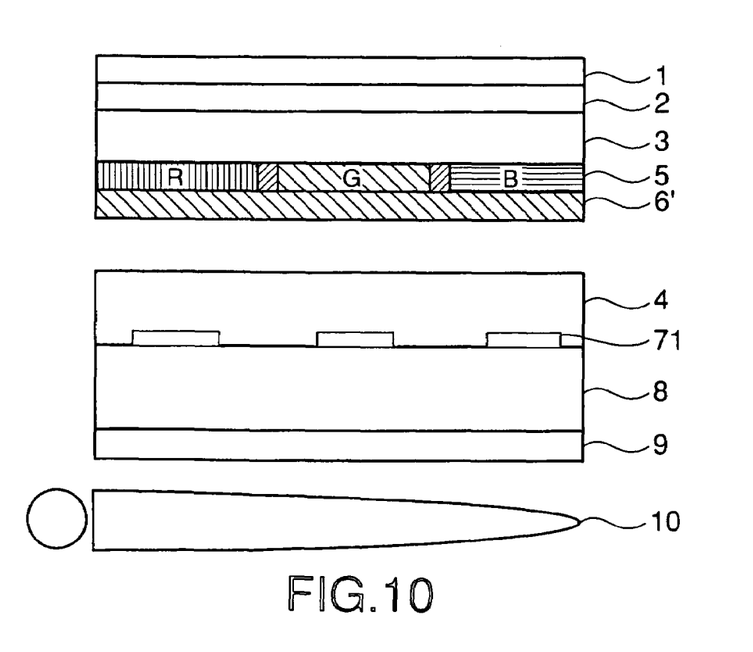
FIG. 10 is a schematic cross-sectional view showing a still further embodiment of a semitransmission liquid crystal display device using the optical element according to the present invention.
Figure 11:
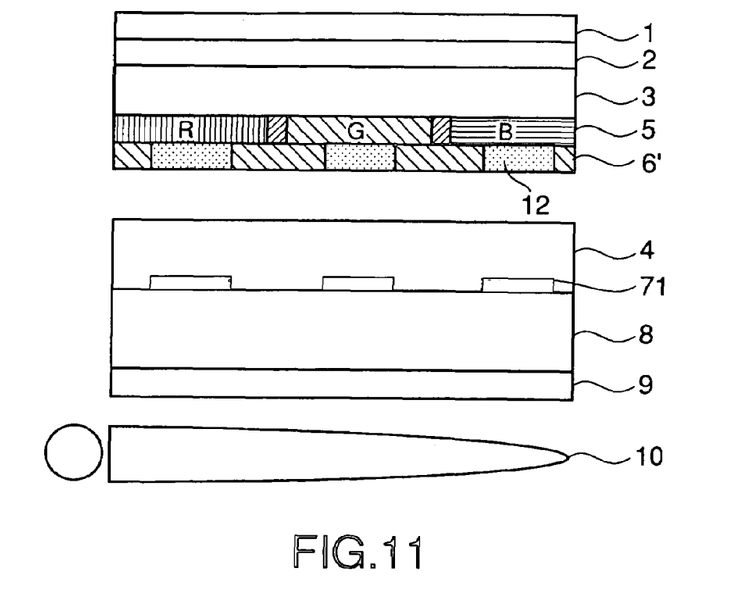
FIG. 11 is a schematic cross-sectional view showing another embodiment of a semitransmission liquid crystal display device using the optical element according to the present invention.

Furthermore, as shown in FIG. 10, a color filter layer (including a light-shielding layer) 5 and a front phase difference plate 6' may be located on a viewer side (on a front side) relative to a liquid crystal layer 4. In this case, as shown in FIG. 11, the phase difference plate 6' may be patterned in the same manner as described above. From the viewpoint of eliminating a difference in surface level caused by patterning of the phase difference plate, a transparent layer 12 is preferably provided at portions where the phase difference plate is absent.

Figure 12:
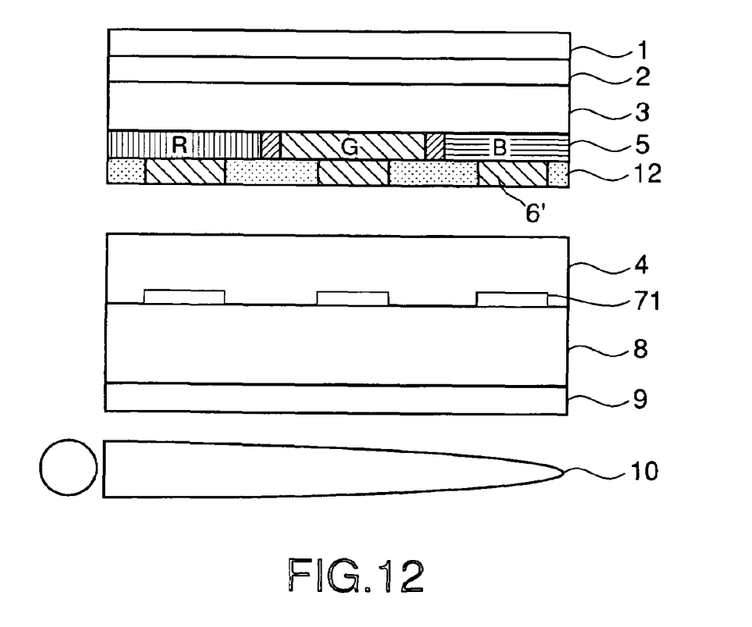
FIG. 12 is a schematic cross-sectional view showing still another embodiment of a semitransmission liquid crystal display device using the optical element according to the present invention.

The application of the optical element according to the second aspect of the present invention to a semitransmission liquid crystal display device is shown in FIG. 12. A front phase difference plate 6' may be provided on the upper part of a reflecting layer (a reflecting electrode) 71 so that only external light (front light) in its part reflected from the reflecting electrode is incident to the phase difference plate. In this case, a transparent layer 12 formed of a transparent resin or the like is provided in parts where the phase difference plates 6' are absent. By virtue of the provision of the transparent layer, a difference in level caused between the phase difference plate 6' and the transparent layer 12 can be regulated according to need. For example, the thickness of the transparent layer 12 can be regulated so as not to cause a difference in level between the phase difference plate 6' and the transparent layer 12 (see FIG. 12). Further, a difference in level can be positively provided between the phase difference plate 6' and the transparent layer 12 by regulating the thickness of the transparent layer (not shown).

Figure 13:
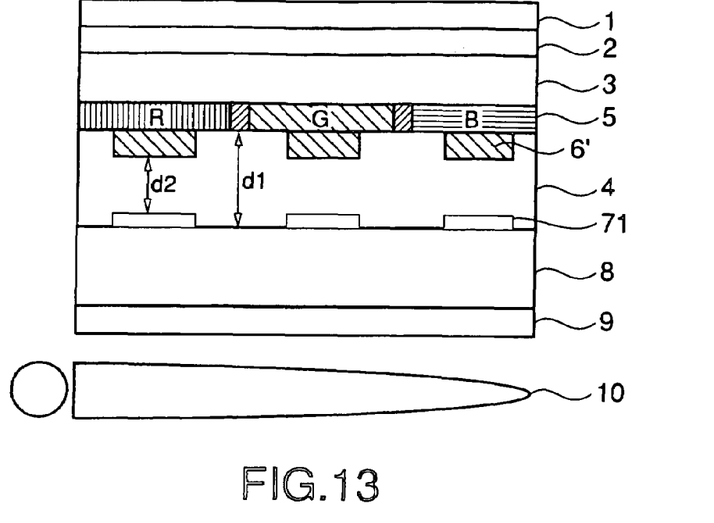
FIG. 13 is a schematic cross-sectional view showing a further embodiment of a semitransmission liquid crystal display device using the optical element according to the present invention.

Further, as shown in FIG. 13, preferably, the phase difference plate is brought to an in-cell form, and the thickness of the phase difference plate is regulated so that an optical distance (gap d1) necessary for light reflected from the reflecting electrode 71 to reach the phase difference plate 61 is half of the thickness (gap d2) of the liquid crystal layer, that is, $d_1 = \frac{1}{2} d_2$. Thus, the phase difference of light can be made even in the reflection area part and the transmission area part.

Figure 14:
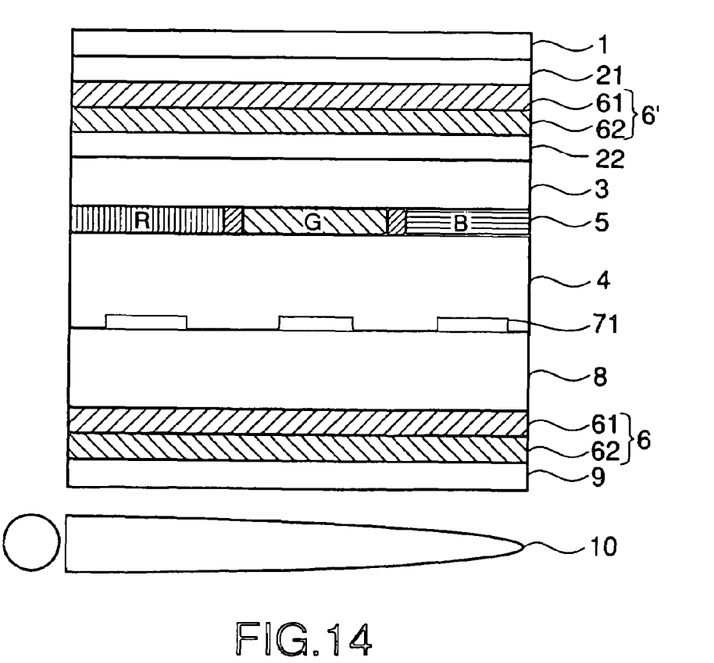
FIG. 14 is a schematic cross-sectional view of a conventional liquid crystal display device.
Figure 15:
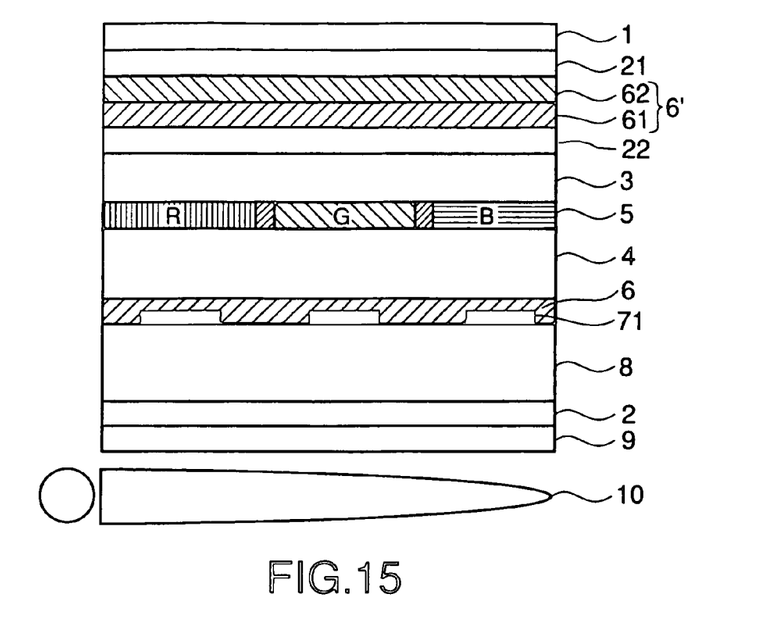
FIG. 15 is a schematic cross-sectional view showing another embodiment of a semitransmission liquid crystal display device using the optical element according to the present invention.

The optical element according to the present invention can also be suitably used in a conventional circular polarization-mode VA-type liquid crystal display device as disclosed in Japanese Patent Laid-Open No. 35570/2000. As shown in FIG. 14, the construction of the conventional circular polarization-mode VA-type liquid crystal display device is such that a front phase difference plate 2 comprising a phase difference plate (+A plate) 21 and a phase difference plate (−C plate) 22 is provided and a circularly polarizing phase difference plate of a combination of a half-wave phase difference layer 62 with a quarter-wave phase difference layer 61 is provided on a rear light side and a front light side. In the present invention, as shown in FIG. 15, a phase difference plate is provided in a liquid crystal cell, and a phase difference plate on the rear side is provided on a rear linearly polarizing plate. The provision of the phase difference plate in an in-cell form can improve the utilization efficiency of light in the liquid crystal display device.

Figure 16:
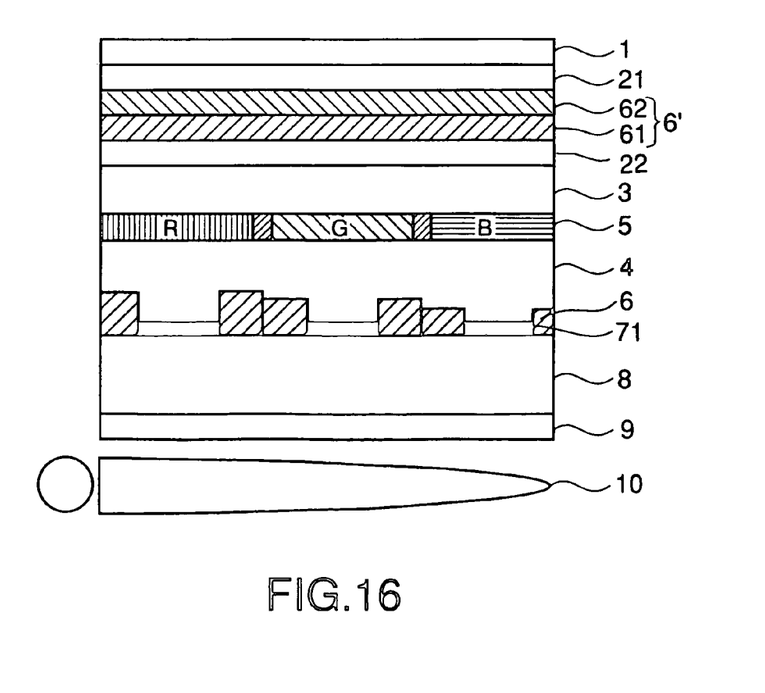
FIG. 16 is a schematic cross-sectional view showing still another embodiment of a semitransmission liquid crystal display device using the optical element according to the present invention.

Further, as shown in FIG. 16, the thicknesses of the phase difference plates which have been brought to an in-cell form can also be regulated for respective wavelength regions of R, G, and B. Actual retardation can be brought to a value close to an ideal value by regulating the thicknesses of the phase difference plates for respective colors, that is, respective wavelength regions, and, thus, wavelength dispersion can be suppressed. Further, since the circularly polarizing phase difference plate on the rear side, which is required in the conventional circular polarization-mode VA-type liquid crystal display device, can be brought to an in-cell form, the utilization efficiency of light in the liquid crystal display device can be improved.

Figure 17:
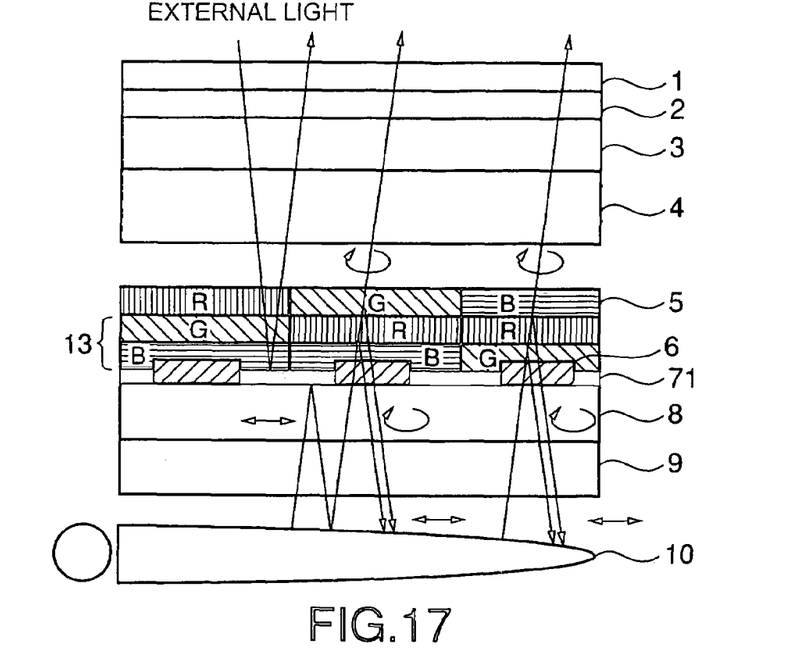
FIG. 17 is a schematic cross-sectional view showing a further embodiment of a semitransmission liquid crystal display device using the optical element according to the present invention.

In another embodiment of the present invention, in order to positively increase light reflected toward the backlight side, a selective reflection-type cholesteric liquid crystal filter can also be used as a color filter. In recent years, a color filter formed by forming a thin layer of a cholesteric liquid crystal and bringing the thin layer to a film form (hereinafter referred to as "cholesteric color filter") has become known. In the cholesteric color filter, only a light component with predetermined wavelengths in incident light can be converted to circularly polarized light and reflected according to the spiral pitch of the cholesteric liquid crystal, while the other wavelengths are transmitted through filter. When an absorption-type color filter 5 and a cholesteric liquid crystal filter 13 are disposed as shown in FIG. 17, only a desired wavelength can be transmitted through these filters toward the viewer side while positively reflecting light components (G and B in FIG. 17) with wavelengths other than the transmission wavelength toward the backlight 10 side. "R" in the absorption-type color filter 5 represents a color filter through which only R region wavelengths (600 to 700 nm) can be transmitted. On the other hand, "R" in the cholesteric color filter 13 represents a color filter from which only light with R region wavelengths are partly or entirely reflected and through which light with the other wavelengths, i.e., B region wavelengths (400 to 500 nm) and G region wavelengths (500 to 600 nm) can be transmitted. The light reflected from the cholesteric color filter 13 is right-handed or left-handed circularly polarized light. When the direction of circular polarization of the rear phase difference plate 6 is previously regulated to an identical direction, however, the reflected light is not absorbed in the phase difference plate 6 and, consequently, light can be efficiently recycled.

Next, the production process of the optical element will be described in detail.

2. Phase Difference Plate

As described above, a stretched film formed of a polymeric resin can be used in the phase difference plate. Preferably, however, the phase difference plate is formed of polymerizable liquid crystal molecules. Such polymerizable liquid crystals include nematic liquid crystals and cholesteric liquid crystals. Liquid crystal materials usable herein include polymerizable monomer molecules, polymerizable oligomer molecules, or liquid crystal polymers. Polymerizable liquid crystal molecules are preferably polymerizable monomer molecules or polymerizable oligomer molecules from the viewpoint of heat resistance of the phase difference plate. Polymerization of low-molecular weight polymerizable liquid crystal molecules to form a crosslinked structure can improve heat resistance as compared with the use of high-molecular weight liquid crystal molecules. The phase difference plate according to the present invention is formed by coating a coating liquid containing polymerizable liquid crystal molecules on a substrate having an aligning ability and polymerizing the coating by light or the like.

Specific examples of polymerizable liquid crystal molecules usable herein include the following compounds which may be used solely or in a combination of two or more of them. Preferably, the following compounds have two or more polymerizable functional groups.

wherein x is an integer of 2 to 6.

A chiral nematic liquid crystal prepared by adding a chiral agent to a nematic liquid crystal and having cholesteric regularity can also be used. Chiral agents usable herein include the following compounds and further include chiral dopant liquid crystal S-811 (manufactured by Merck) and chiral agents described in Japanese Patent Laid-Open Nos. 95883/2000, 245960/1996, and 53074/1997.

stacking an aligning film on a substrate film or by rubbing a substrate film or an aligning film stacked on the substrate film.

The aligning film is usually formed of polyimide, polyamide, polyvinyl alcohol or the like. The rubbing treatment can be usually carried out by a method wherein rubbing cloth selected from a material such as rayon, cotton, polyamide, polymethyl methacrylate is wound around a metallic wherein x is an integer of 2 to 6.

When these polymerizable liquid crystals are formed, preferably, a photopolymerization initiator is properly added.

In a preferred embodiment of the present invention, the phase difference plate comprises a polymerizable liquid crystal layer provided on a substrate having an aligning ability. Substrates having an aligning ability include, for example, polyimide, polyamide, polyetherimide, polyetherether ketone, polyether ketone, polyketone sulfide, polyethersulfone, polysulfone, polyphenylene sulfide, polyphenylene oxide, polyethylene terephthalate, polybutylene terephthalate, polyethylene naphthalate, polyacetal, polycarbonate, polyallylate, acrylic resin, polyvinyl alcohol, polypropylene, cellulose, triacetylcellulose and partially saponified products thereof, epoxy resin, and phenolic resin. These substrate films may be laminate films of two or more films of films or monoaxially or biaxially stretched films. Further, the substrate film may comprise the above resin provided on a light-transparent substrate such as glass. Furthermore, the substrate film can also be previously subjected to surface treatment such as hydrophilization or hydrophobilization treatment.

The substrate film should have an aligning ability. The aligning ability can be imparted to the substrate film by roll and rotating the laminate in contact with the film or by a method wherein, while, in such a state that the substrate film is fixed onto the roll, the substrate film is carried to rub the film face.

A radiation-curable liquid crystal such as a photopolymerizable liquid crystal having nematic or cholesteric regularity is coated onto the substrate to form an uncured nematic or cholesteric liquid crystal layer. When a three-dimensional crosslinking method is used for the liquid crystal layer curing, for example, a photopolymerization initiator is added to liquid crystal molecules and the mixture is cured by ultraviolet light irradiation. Direct application of an electron beam for curing may also be used. Thus, a phase difference plate can be provided by curing liquid crystal molecules in a three-dimensional crosslinking manner. The coating liquid preferably contains, in addition to the above polymerizable liquid crystal molecules, a photopolymerization initiator and a surfactant. An aligned liquid crystal may be formed by dissolving polymerizable monomer or polymerizable oligomer molecules or a liquid crystal polymer in a solvent to prepare a coating liquid which is then coated onto a substrate having an aligning ability. In this case, three-dimensional crosslinking, or drying before cooling should be carried out. Further, as disclosed in Japanese Patent Laid-Open No. 159708/2001, a method may also be adopted wherein an aligning film is provided on a temporal support and a liquid crystal layer forming material is coated on the aligning film followed by transfer onto a substrate to form a phase difference plate. In this case, as described in Japanese Patent Laid-Open No. 278491/1996, an adhesive layer may be provided between the substrate and the liquid crystal layer from the viewpoint of enhancing the adhesion between the substrate and the liquid crystal layer.

Photopolymerization initiators include benzyl (referred to also as "bibenzyol"), benzoin isobutyl ether, benzoin isopropyl ether, benzophenone, benzoyl benzoate, methyl benzoylbenzoate, 4-benzoyl-4'-methyldiphenyl sulfide, benzyl methyl ketal, dimethylaminomethyl benzoate, 2-n-buthoxyethyl-4-dimethylaminobenzoate, isoamyl p-dimethylaminobenzoate, 3,3'-dimethyl-4-methoxybenzophenone, methylbenzoyl formate, 2-methyl-1-(4-(methylthio)phenyl)-2-morpholinopropan-1-one, 2-benzyl-2-dimethylamino-1-(4-morpholinophenyl)-butan-1-one, 1-(4-dodecylphenyl)-2-hydroxy-2-methylpropan-1-one, 1-hydroxycyclohexyl phenyl ketone, 2-hydroxy-2-methyl-1-phenylpropan-1-one, 1-(4-isopropylphenyl)-2-hydroxy-2-methylpropan-1-one, 2-chlorothioxanthone, 2,4-diethylthioxanthone, 2,4-diisopropylthioxanthone, 2,4-dimethylthioxanthone, isopropylthioxanthone, and 1-chloro-4-propoxythioxanthone. In addition to the photopolymerization initiator, a sensitizer may be added so far as the object of the present invention is not sacrificed.

The amount of the photopolymerization initiator added to the polymerizable liquid crystal material is generally 0.01 to 20% by mass, preferably 0.1 to 10% by mass, more preferably 0.5 to 5% by mass.

In the present invention, preferably, the coating liquid contains a surfactant. The presence of a surfactant can improve the aligning ability of the liquid crystal aligning layer constituting the aligning plate. Suitable surfactants usable herein include, but are not limited to, the following compounds.

In order that the above liquid crystal material functions as the phase difference plate, the liquid crystal material should be formed so as to be anisotropic in refractive index. The anisotropy of the refractive index varies depending upon the liquid crystal material used and the aligning ability of the surface of the substrate. In general, in a plane parallel to the aligning direction, when X axis at a right angle to the aligning direction and Y axis parallel to the aligning direction are assumed, the difference $\Delta n$ between the refractive index in the X axis direction, $n_x$, and the refractive index in the Y axis direction, $n_y$, that is, $$\Delta n = |n_x - n_y|$$

is not less than 0.05, preferably not less than 0.1, because, if the phase difference plate does not have this level of anisotropy of refractive index, then there is a possibility that a practical problem occurs, e.g., in the thickness of the phase difference plate.

In an embodiment of the present invention, the tilt angle of molecules constituting the polymerizable liquid crystal layer is preferably substantially identical to the tilt angle of the liquid crystal material constituting the liquid crystal display device. When an aligning film is used so that the tilt angle of polymerizable liquid crystal molecules near the aligning film of the substrate is identical to the tilt angle of the liquid crystal material constituting the liquid crystal cell, phase difference plates, which have a symmetrical visible angle with respect to the left and right phase difference plates or upper and lower phase difference plates, can be formed. The expression "substantially identical" means that the difference between the tilt angle of molecules constituting the polymerizable liquid crystal layer and the tilt angle of the liquid crystal material constituting the liquid crystal display device is within ±1°.

3. Patterning of Phase Difference Plate

In constituting a semitransmission liquid crystal display device as shown in FIG. 4 using the phase difference plate as prepared above, the light-shielding layer should be patterned so as not to cover the phase difference plate. Methods usable for pattern formation include a laser beam method which will be briefly described later (see Japanese Patent Application Nos. 100975/2001 and 101004/2001) and a lithography method (see Japanese Patent Application No. 317965/2001). Further, other techniques such as various printing methods may of course be used. A conventional method, in which a phase difference plate is manually cut off into a desired shape which is then applied, may also be used. This method, however, involves a problem of cost, and there is a limitation on high-definition patterning.

In the laser beam method, patterning is carried out by applying a laser beam having a wavelength in an absorption band of the liquid crystal layer to a phase difference plate comprising a liquid crystal layer and an aligning substrate to partially evaporate and remove the phase difference plate. When a short-wavelength laser beam in an ultraviolet light region is used as the laser beam, the chemical bond of liquid crystal molecules is cut and contribution of cutting by heat is reduced. Therefore, the peripheral part of the cut part is not melted, and patterning can be carried out without influence on the peripheral part (the part which stays as the phase difference plate). On the other hand, when a long-wavelength (infrared) laser beam is used, the phase difference plate is melted. Therefore, an inclination is likely to occur in the cut surface. Further, a cut end part rises. This makes it impossible to conduct high-definition patterning. However, patterning can be carried out at a lower cost than that using the short-wavelength laser beam.

The lithography method can be applied to the case where the liquid crystal layer is formed of a polymerizable monomer or a polymerizable oligomer. Specifically, the pattern is formed by a mask exposure method wherein ultraviolet light or the like is applied selectively to only parts where the light-shielding layer is absent. That is, ultraviolet light or the like is applied so that three-dimensional crosslinking is not carried out in parts where the light-shielding layer is present. Thereafter, the liquid crystal layer is immersed in a solvent which can dissolve the polymerizable monomer or the polymerizable oligomer to dissolve the polymerizable monomer or the polymerizable oligomer remaining unthree-dimensional crosslinked in the solvent and consequently to remove that monomer or oligomer. Thus, a desired pattern can be formed in the phase difference plate. Immersion methods usable herein include swinging and spin showering methods and various coating methods. When a nonphotosensitive liquid crystal material (for example, a polymeric liquid crystal material) is used, patterning can also be carried out by forming a film using the liquid crystal material, coating a photoresist onto the liquid crystal layer, and conducting etching for patterning.

The invention claimed is:

1. An optical element for a liquid crystal display device, comprising:
   a polarizer for converting light emitted from a back light source to linearly polarized light;
   a reflecting layer comprising a reflection area part for reflecting the linearly polarized light converted by the polarizer and a transmission area part for transmitting the linearly polarized light converted by the polarizer; and
   at least one phase difference plate which is disposed so that only the light transmitted through the transmission area part after conversion of the light source-derived light to the linearly polarized light by the polarizer is incident to said phase difference plate.

2. The optical element according to claim 1, wherein the phase difference plate is provided on the upper part of the reflection area part.

3. The optical element according to claim 2, wherein a distance between the reflection area part and the phase difference plate is regulated by the thickness of the phase difference plate.

4. The optical element according to any one of claims 1, 3, and 2, wherein at least one phase difference plate, in which, when the refractive indexes in the orthogonal axis direction within a plane of the phase difference plate are $n_x$ and $n_y$ and the refractive index of the phase difference plate in its plate thickness-wise direction is $n_z$, a relationship represented by formula $n_x \neq n_y$ is satisfied, is included in the phase difference plate.

5. The optical element according to claim 4, wherein at least one phase difference plate satisfying a relationship represented by formula $n_x = n_y \neq n_z$ is included in the phase difference plate.

6. The optical element according to any one of claims 1, 3, and 2, wherein said phase difference plate is integral with an absorption-type color filter layer.

7. The optical element according to any one of claims 1, 3, and 2 wherein said phase difference plate comprises a substrate having an aligning ability and a polymerizable liquid crystal layer provided on the substrate.

8. The optical element according to claim 7, wherein the tilt angle of molecules constituting the polymerizable liquid crystal layer is substantially identical to that of liquid crystal molecules within a liquid crystal cell.

9. The optical element according to claim 7, wherein said polymerizable liquid crystal layer has been formed by coating a coating liquid containing polymerizable liquid crystal molecules, a photoinitiator, a surfactant, and a solvent onto said substrate.

10. The optical element according to claim 7, wherein said polymerizable liquid crystal can form a nematic phase or a cholesteric phase.

11. The optical element according to claim 1, wherein a high-reflectance layer is provided on the whole area of the reflecting layer on its back light source side.

12. The optical element according to claim 11, wherein said reflecting layer is a light-shielding layer or/and a reflecting electrode.

13. The optical element according to claim 11, wherein said high-reflectance layer is formed of at least one material selected from the group consisting of aluminum (Al), silver (Ag), and silver alloys.

14. The optical element according to claim 11, wherein said high-reflectance layer is formed of a dielectric multi-layer film.

15. A liquid crystal display device comprising the optical element according to any one of claims 1, 3, and 2.

16. A semitransmission-type liquid crystal display device comprising the optical element according to any one of claims 1, 3, and 2, said liquid crystal layer being a birefringence-mode liquid crystal layer.

* * * * *